US006336173B1

(12) United States Patent
Day, III et al.

(10) Patent No.: US 6,336,173 B1
(45) Date of Patent: *Jan. 1, 2002

(54) STORING AND TRACKING MULTIPLE COPIES OF DATA IN DATA STORAGE LIBRARIES

(75) Inventors: Kenneth Fairclough Day, III; Douglas William Dewey; Dean Lee Hanson; William David LaMear, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/283,223

(22) Filed: Apr. 1, 1999

(51) Int. Cl.[7] .............................................. G06F 12/06

(52) U.S. Cl. ....................... 711/161; 707/201; 709/248; 711/112; 714/6

(58) Field of Search ................................ 711/112, 114, 711/111, 161, 162; 707/201, 204, 10; 709/212, 213, 245, 200, 248; 714/13, 6

(56) References Cited

U.S. PATENT DOCUMENTS

| | | | |
|---|---|---|---|
| 4,755,928 A | | 7/1988 | Johnson et al. ................. 714/6 |
| 5,155,845 A | | 10/1992 | Beal et al. ....................... 714/6 |
| 5,222,217 A | | 6/1993 | Blount et al. ................. 707/204 |
| 5,274,645 A | | 12/1993 | Idleman et al. ................. 714/6 |
| 5,408,470 A | * | 4/1995 | Rothrock et al. ............ 370/261 |
| 5,446,871 A | * | 8/1995 | Shomler et al. ............... 714/1 |
| 5,546,535 A | | 8/1996 | Stallmo et al. ................. 714/9 |
| 5,555,371 A | | 9/1996 | Duyanovich et al. ......... 714/13 |
| 5,574,849 A | * | 11/1996 | Sonnier et al. ................ 714/12 |

(List continued on next page.)

OTHER PUBLICATIONS

Rao et al., "A Transparent Service for Synchronized Replication Across Loosely–Connected File Systems", 2nd International Workshop on Services in Distributed & Network Environments, p110–117.*

Zeng, X. et al., GloMoSim: A Library for Parallel Simulation of Large–Scale Wireless Networks, IEEE Workshop on Parallel and Distributed Simulation, pp. 154–161, May 1998.*

Ramanathan et al., "Fault–Tolerant Clock Synchronization in Distributed Systems", IEEE Computer Magazine, vol. 23 #10, p. 33–42, Oct. 1990.

Fred B. Schneider, "Implementing Fault–Tolerant Services Using the State Machine Approach: A Tutorial", ACM Computing Surveys, vol. 22, No. 4, p. 299–319, Dec. 1990.

*Primary Examiner*—Matthew Kim
*Assistant Examiner*—Pierre-Michel Bataille
(74) *Attorney, Agent, or Firm*—John H. Holcombe; Robert M. Sullivan

(57) ABSTRACT

A data storage library subsystem and a method for storing, and maintaining and tracking synchronism between, multiple copies of identifiable data volumes between hosts and a plurality of data storage libraries, and transparent to the hosts. The library controller of each library provides an updatable synchronization token directly associated with each data volume. A plurality of directors are provided, each separate from and coupled to the hosts and each separate from and coupled to each data storage library. Each director responds to ones of separate, partitioned access addresses addressed by the hosts. The responding director supplies each data volume supplied from a host to all of the data storage libraries, and updates each synchronization token directly associated with the supplied data volume. Thus, the directors store duplicate copies of the data volume in the data storage libraries without involvement by the host. The currency of the data volumes are each tracked by means of the directly associated synchronization token, and the synchronization token is not tracked by the host nor is a central tracking database required.

51 Claims, 9 Drawing Sheets

U.S. PATENT DOCUMENTS

| | | | |
|---|---|---|---|
| 5,682,527 A | | 10/1997 | Cooper et al. ............... 707/202 |
| 5,689,706 A | * | 11/1997 | Rao et al. .................... 707/201 |
| 5,708,769 A | | 1/1998 | Stallmo ......................... 714/6 |
| 5,761,526 A | | 6/1998 | Sakakura et al. .............. 710/1 |
| 5,884,325 A | * | 3/1999 | Bauer et al. ................. 707/201 |
| 5,895,493 A | * | 4/1999 | Gatica ......................... 711/147 |
| 5,924,096 A | * | 7/1999 | Draper et al. ................. 707/10 |
| 5,926,816 A | * | 7/1999 | Bauer et al. .................... 707/8 |
| 5,956,489 A | * | 9/1999 | Andres et al. .............. 709/221 |
| 5,978,813 A | * | 11/1999 | Foltz et al. ................. 707/201 |
| 6,000,000 A | * | 12/1999 | Hawkins et al. ............ 707/201 |
| 6,052,797 A | * | 4/2000 | Ofek et al. ..................... 714/6 |
| 6,061,741 A | * | 5/2000 | Murphy, Jr et al. ........ 709/248 |
| 6,065,018 A | * | 5/2000 | Beier et al. ................. 707/202 |

* cited by examiner

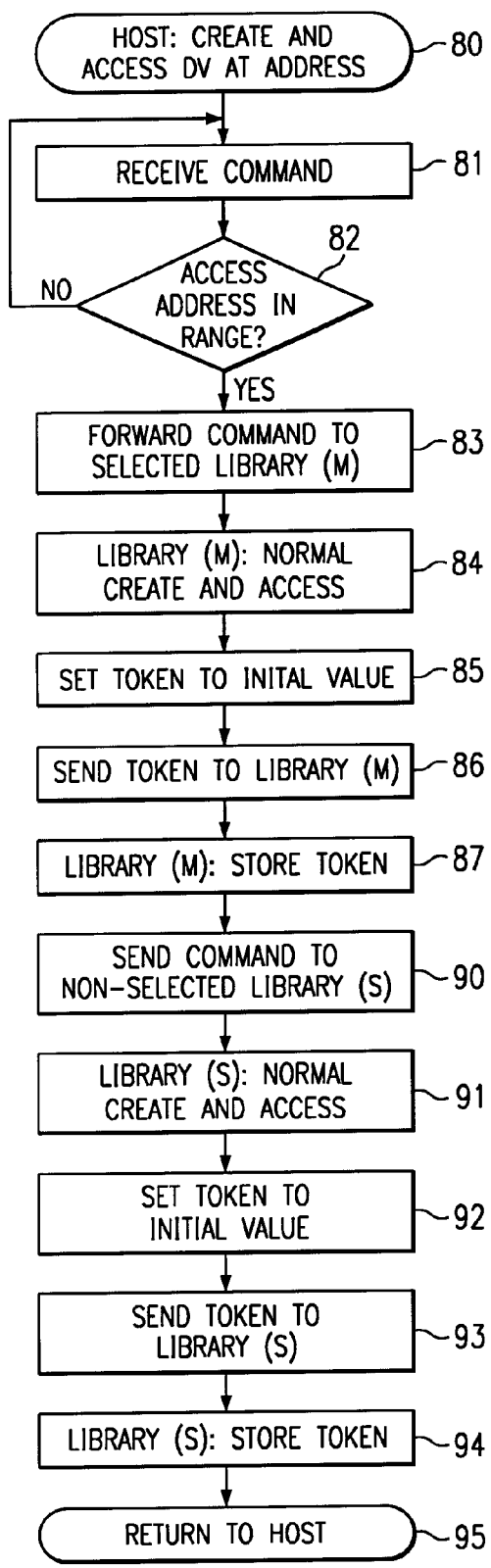
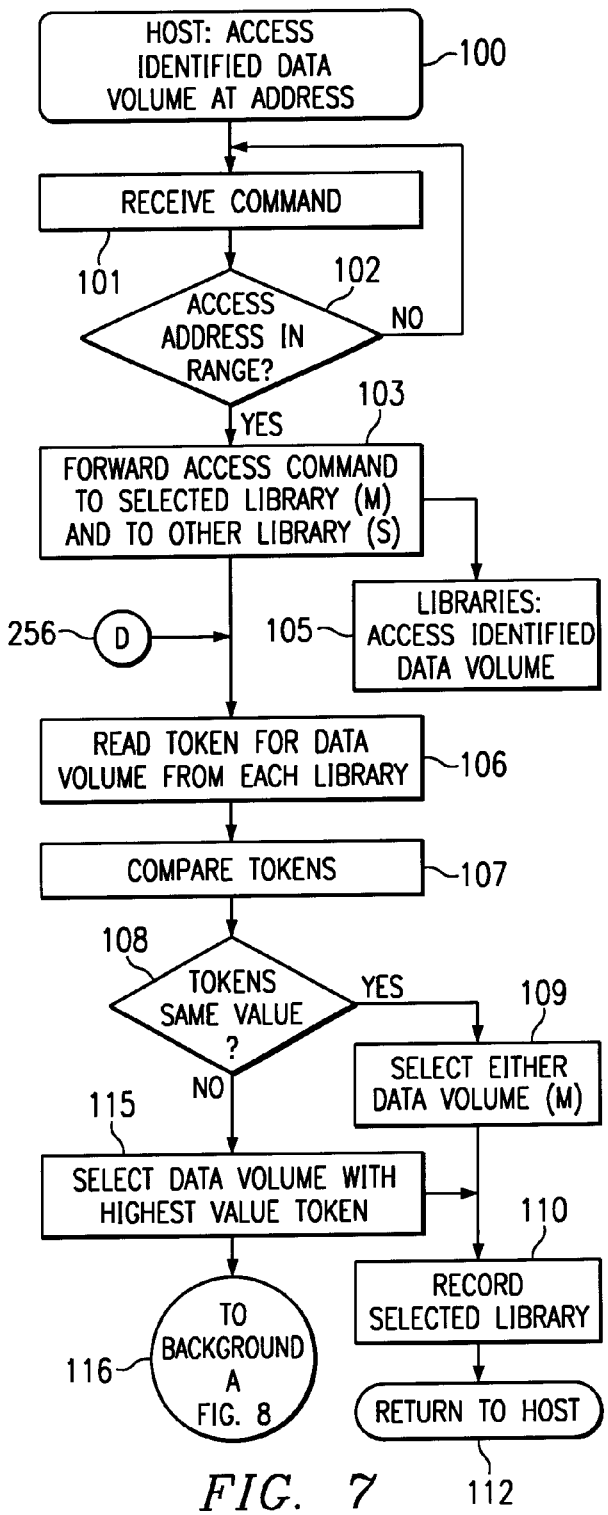
FIG. 6
FIG. 7

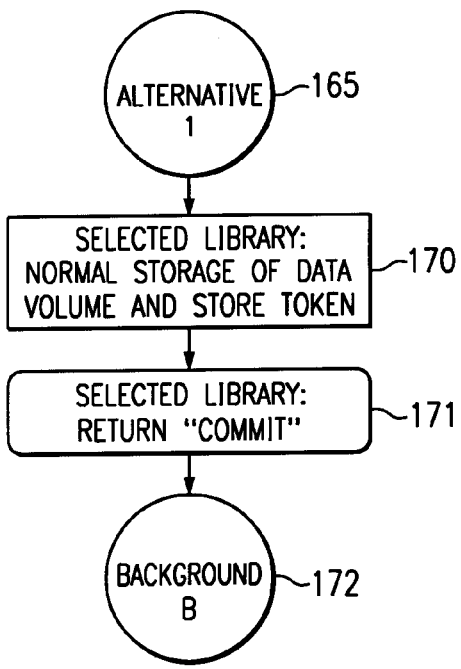
FIG. 10
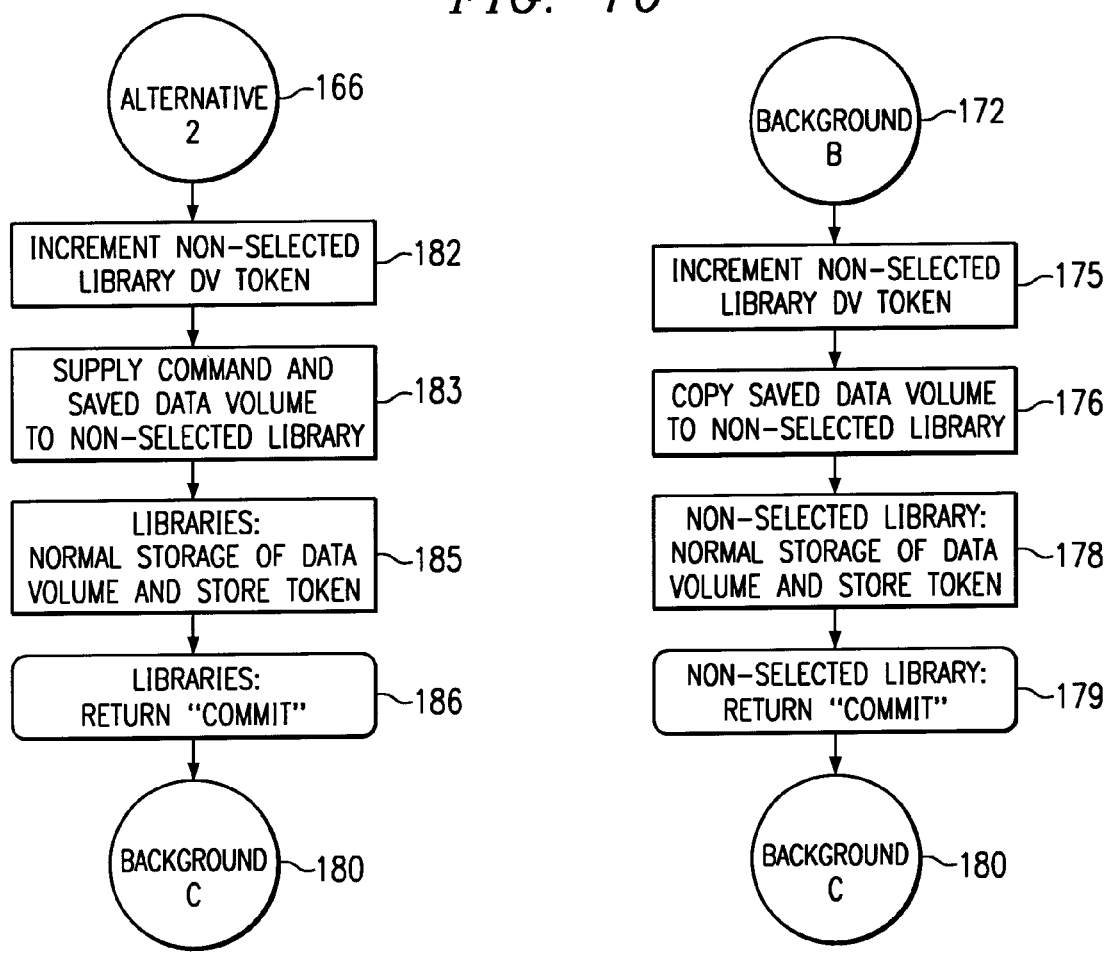
FIG. 11
FIG. 12

STORING AND TRACKING MULTIPLE COPIES OF DATA IN DATA STORAGE LIBRARIES

CROSS REFERENCE TO RELATED APPLICATION

Copending and co-assigned U.S. patent application Ser. No. 09/283,222 filed on even date herewith relates to data storage library systems for storing and tracking multiple copies of data in system data storage libraries, and to methods and computer program products for operating the data storage library systems.

TECHNICAL FIELD

This invention relates to storage of data on rewritable data storage media which is accessible in data storage libraries, and, more particularly, to providing access by at least one host to multiple copies of data volumes stored in a plurality of data storage libraries.

BACKGROUND OF THE INVENTION

Data processing systems comprising at least one host typically require a large amount of data storage. If the data, typically stored as a data volume, is not immediately required by the hosts, for example if the data volume is infrequently accessed, the storage of the data volume may be on removable rewritable data storage media, such as magnetic tape or optical disk. Data storage libraries typically provide efficient access to large quantities of data volumes stored in removable data storage media, the media stored in storage shelves which are accessed by robots under the control of robot controllers. Due to the large amount of stored data, typically, a plurality of hosts make use of the same data storage library, and a plurality of data storage drives are included in the library to allow access by the hosts. A library manager, which may comprise the same processor as the robot controller, typically tracks each data volume and the data storage media on which it is stored, and tracks the storage shelf location of each data storage media.

Herein, a library manager, either with or without the robot controller, is defined as a "library controller".

Because access to the data volumes would be prohibited if the robot were to fail, many data storage libraries have dual robots. Also, such libraries often are equipped with dual power supplies to provide a level of redundancy in case of failure of one of the power supplies. Further, dual library controllers may be used, each operating one of the robots. Coassigned U.S. patent Number (Ser. No. 08/961,135), Fosler et al., provides dual library controllers and dual robots and, upon the failure of one robot, quickly and automatically switches the active one of the library controllers to operate the second robot.

The dual robots must each use a common track or rail to access the storage shelves of the data storage library. If a failure causes the common track or rail to become unusable, for example, if a robot became stuck, the library would be unusable. A communication link between the host and library may fail, losing access to the data volumes. Similarly, if the entire library were to fail, for example, by a failure of the power connection to the library, the access to the data volumes would be prohibited until repairs were completed.

Individual data storage drives not in a library, but with human operators, would be able have the operator hand carry a removable data storage media from a failing drive to another drive which is coupled to the same host. However, if the only library failed, no alternative drive would be available for mounting the removable data storage media, and physical access to the media may be difficult. Further, if the library is a "virtual" library, temporarily storing data in memory or non-volatile cache before storing it in the removable data storage media, the temporarily stored data cannot be transferred from a failed library.

Duplicate libraries may be envisioned, but the hosts would have to separately provide the data volumes to each of the libraries and provide a tracking database, dramatically reducing efficiency. Perhaps only the more important data volumes would be duplicated, but each host would have to track the individual location of each data volume that was not duplicated, and track the data volumes which were duplicated.

SUMMARY OF THE INVENTION

It is an object of the present invention to provide dual data storage libraries and storage and tracking of data stored in the dual data storage libraries which is transparent to the hosts.

Disclosed are a data storage library system and a method for redundantly storing and accessing identifiable data volumes. A plurality of data storage libraries, each having a library controller, a storage interface, rewritable data storage media, and at least one data storage drive for reading and/or writing on the data storage media. The data volumes are transferred, under the control of the library controller, between the storage interface and the data storage drive. The library controller provides a synchronization token directly associated with each data volume, the synchronization token comprising an updatable token.

A plurality of directors are provided, each separate from and coupled to the hosts and each separate from and coupled to each data storage library. A director is a data processor with interfaces, such as ESCON or SCSI, appropriate to the connections to the hosts and to coupled data storage libraries, but without a display, and comprises, for example, an IBM RS-6000 processor. Each director receives commands relating to identifiable data volumes, and each director responds to separate, partitioned access addresses addressed by the hosts. The responding director additionally responds to any accompanying data volume supplied by the addressing host, in turn supplying the command and accompanying data volume to all of the plurality of data storage libraries, and the responding director updates each synchronization token directly associated with the supplied data volume.

The synchronization tokens may comprise incrementable integers, which are updated by the responding director by incrementing each synchronization token directly associated with the supplied data volume. The responding director may increment each synchronization token directly associated with the same supplied data volume to the same integer value. The director may determine the integer value by comparing the previous integer value of each synchronization token directly associated with the supplied data volume, and setting the synchronization tokens to a value incremented beyond the most current integer value indicated by the comparison.

Thus, in accordance with the present invention, the directors appear to the host as though there is a single library, and the directors have the capability to store duplicate copies of the data volume in the data storage libraries without involvement by the host. The currency of the data volumes are each tracked by means of the synchronization token, and the synchronization token is directly associated with the data volume, and is not tracked by the host and does not require a central tracking database.

Further, should one library become unavailable, the responding director may access the data volume at another of the libraries without involvement by the host. The director may update the data volume and the synchronization token at the other library, and, when the failed library becomes available and the data volume again is accessed, the responding director will determine that the synchronization tokens do not match, will provide the most current copy to the host, and will update the data volume that was not current, again without involvement by the host.

The library controller may store the synchronization tokens with the rewritable data storage media storing the data volumes directly associated therewith, or, alternatively, may maintain a table of the synchronization tokens, the table directly associating the synchronization tokens with the data volumes.

The concepts of "MASTER/SLAVE" or "PRIMARY/SECONDARY" may be employed in another aspect of the present invention. One of the plurality of data storage libraries is designated as a "MASTER" library and all the other data storage libraries are each designated as a "SLAVE" library, and the responding director, when addressed by the host access address, supplies a host supplied data volume first to the "MASTER" library and second to the "SLAVE" libraries. The director may copy the data volume from the "MASTER" library to the "SLAVE" libraries, and not require involvement by the host in making the duplicate copies.

The present invention effectively distributes the tracking database to the media or to the libraries actually storing the copies, and does so transparently to the hosts. Thus, there is no requirement for the hosts to provide a single central database at one of the hosts, or at high availability hardware at one of the hosts, nor to provide separate distributed databases at each of the hosts.

The present invention is especially advantageous for tape libraries. Data volumes are provided to the library and the host waits until the tape drive writes the data volumes to the removable tape media, or until a "virtual" library writes the data volumes to on-volatile cache, before providing a "return" signal to the host. With the present invention, the director provides the "return" signal to the host without waiting for all the libraries to respond, in effect, providing buffering and a synchronous overlap, while not requiring a special non-volatile cache.

For a fuller understanding of the present invention, reference should be made to the following detailed description taken in con unction with the accompanying drawings.

BRIEF DESCRIPTION OF THE DRAWINGS

FIG. 6 is a flow chart depicting an embodiment of a method in accordance with the present invention for creating and accessing a new data volume in the data storage library system of FIG. 1;

FIGS. 7 and 8 are flow charts depicting an embodiment of a method in accordance with the present invention for accessing an identified data volume in the data storage library system of FIG. 1;

FIGS. 9–13 are flow charts depicting alternative embodiments of a method in accordance with the present invention for storing a host supplied data volume in the data storage library system of FIG. 1.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
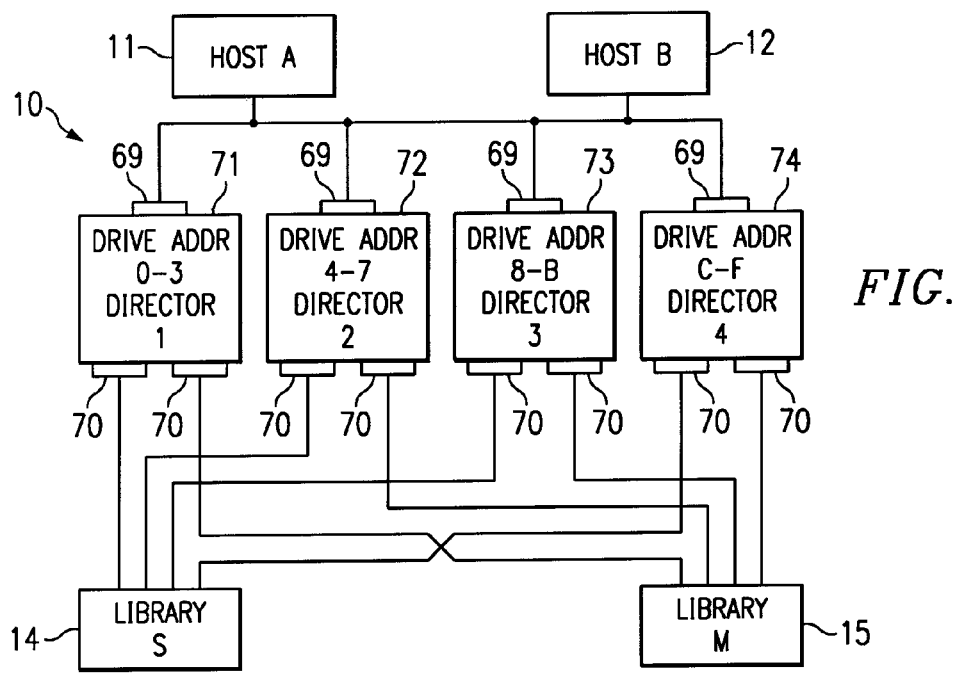
FIG. 1 is a block diagram showing interconnection of functional components of a data storage library system in accordance with an embodiment of the present invention.

Referring to FIG. 1, an embodiment of a data storage library system 10 is illustrated which redundantly couples host systems 11 and 12 to data storage libraries 14 and 15. In one embodiment of the invention, one of the data storage libraries is designated as a "MASTER" library, e.g., library 15, and all the other data storage libraries are each designated as a "SLAVE" library, e.g., library 14.

The host systems 11 and 12 may be embodied by a variety of types and numbers of processing units, servers, or computing systems. The data storage libraries 14 and 15 may comprise any similar libraries for storing removable rewritable data storage media, such as tape cartridges or optical disks. An example of a suitable data storage library is the IBM 3494 Virtual Tape Storage System.

Figure 2:
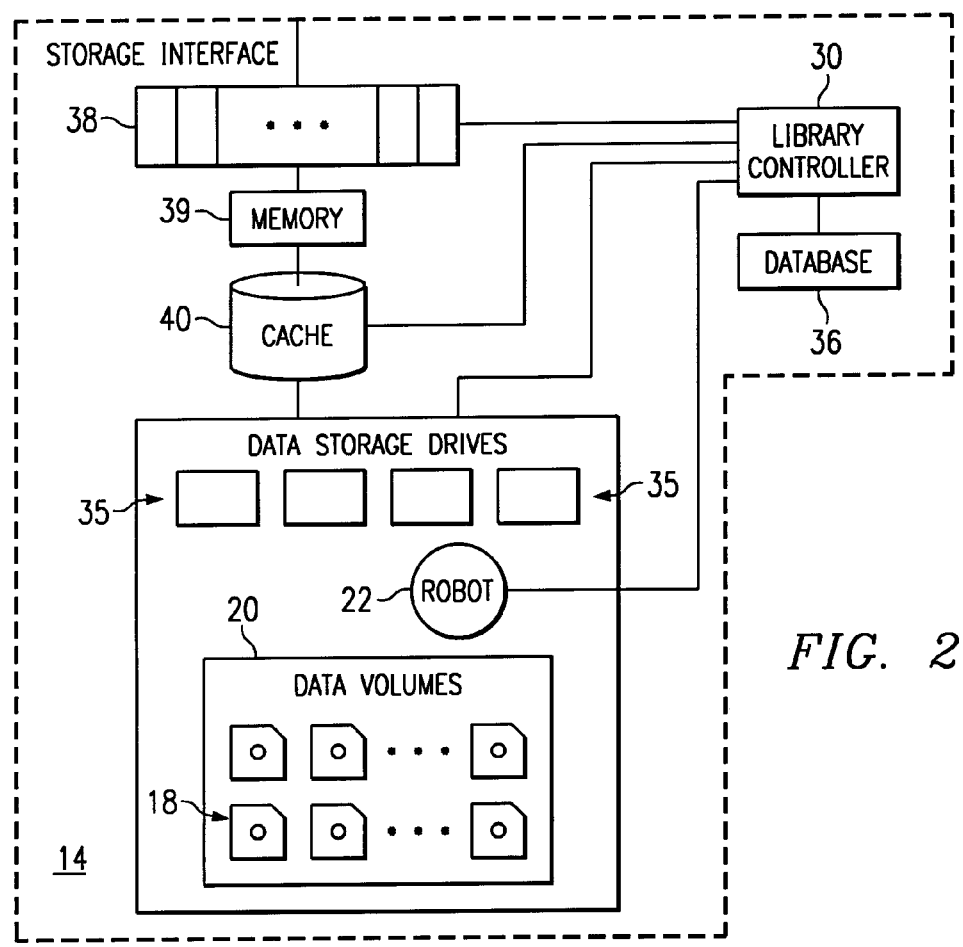
FIG. 2 is a block diagram showing function components of an example of a data storage library of FIG. 1.

Referring additionally to FIG. 2, data storage libraries 14 and 15 provide storage and access to large quantities of data volumes 18 stored in removable data storage media, the media stored in storage shelves 20 which are accessed by at least one robot 22 under the control of a library controller 30. A plurality of data storage drives 35 are included in the library to allow access to read and/or write data volumes 18. The library controller 30 may include a library manager which utilizes a database 36 to track each data volume and the data storage media on which it is stored, and to track the storage shelf location 20 of each data storage media. Communication with the library is conducted at a storage interface 38 to a buffer memory 39, and to the addressed drive 35.

A host typically communicates with a data storage library to access an identified data volume, and provides the address of the particular data storage drive 35 that the host desires that the data volume be delivered to, which, herein may comprise an "access" address. The library controller 30 identifies the data storage media and the storage shelf 20 containing the data volume. The library controller then operates the robot 22 to access the data storage media from the storage shelf and to deliver the data storage media to the addressed drive 35. When the data storage media containing the identified data volume 18 is delivered to the addressed drive, and physically mounted on the drive, the library controller 30 provides a "READY" signal at storage interface 38 to the addressing host. The data volume is then typically read and/or written by the addressing host via data transfer at the storage interface 38 to a buffer memory 39, and to the addressed drive 35

The assignee of the present invention has introduced tape libraries which are Virtual Tape Servers for handling data transfers with tape drives functioning with high bursts of activity, and for quickly transferring data to a library without waiting for the data storage media to be loaded. The hosts address desired tape drives 35 in the library, but the Virtual Tape Server actually has a non-volatile cache memory 40 which is treated as though it is a number of tape drives with mounted media. The cache memory tape drives are "virtual drives". Thus, when a host processor reads a data volume 18 from a tape, it remains stored as a file in the cache memory 40 at an address of the virtual drive. Similarly, when a host migrates data volumes to a tape drive, the data volumes are first stored at the cache memory virtual drive 40 (via buffer memory 39) and then stored in the tape media at a library tape drive 35. The data remains in the cache memory 40 for a period of time, managed by the Virtual Tape Server library controller 30, and is available for immediate access by the host without waiting for the tape media to be accessed by the robot 22 and mounted on the library tape drive 35.

When data volumes are migrated to the Virtual Tape Server, the original data volumes are deleted from the host storage. Since the deleted data volumes are no longer retrievable at the host after deletion, it is desirable that there be an assurance that the data volumes 18 have actually been stored in the library non-volatile cache memory 40 or the tape media before the original data volumes are deleted. Hence, the Virtual Tape Server library controller 30 ensures that the data has been transferred from any volatile buffer 39 and stored in non-volatile cache 40 by means of a "COMMIT" event. The controller provides the "COMMIT" event by providing a "RETURN" signal to the host only upon successful completion of the specified command to indicate that the data volume or volumes 18 have been successfully stored on library non-volatile store.

The present invention may be employed with a typical data storage library having a library controller 30, and is advantageously employed with a Virtual Tape Server in utilizing the "COMMIT" events, as will be explained.

Figure 3:
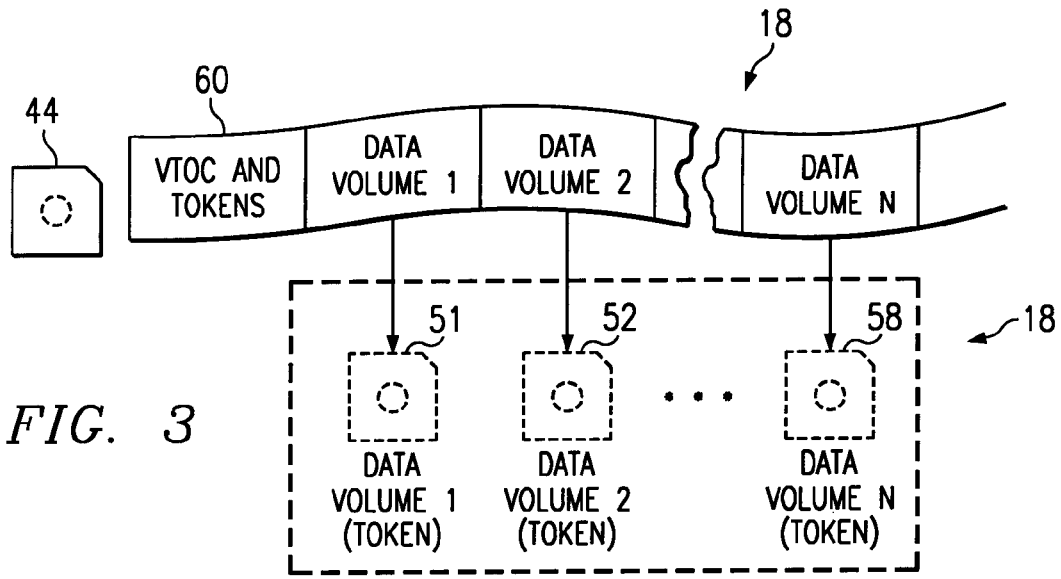
FIG. 3 is a generalized diagram of logical data volumes stored on a single physical volume for use in a data storage library of FIGS. 1 and 2.

Typically, in removable data storage systems, a plurality of data volumes 18 are stored on a single physical data storage media, called a physical volume. FIG. 3 is a schematic representation of a physical volume 44, such as a magnetic tape in a cartridge, which contains N logical volumes, thereby replacing N individual tape cartridges 51 through 58. The storage of multiple logical data volumes in a single physical volume is called "volume stacking". In one configuration, a single physical volume can include up to 140 logical volumes of 50 MB each, each of which can be individually addressed and accessed. In another configuration a single physical volume can include a variable number of logical data volumes of variable size, each of which can be individually addressed and accessed. Herein, a data volume 18 may comprise a logical volume 51, etc., or, if no logical volumes are provided, a data volume 18 may comprise a physical volume 44.

The key identifier for both logical data volumes and physical volumes is the "Volume Serial Number" or "VOLSER", comprising a predetermined number of characters or blanks. Most physical volumes have the VOLSER, or a similar identifier which is translatable to a VOLSER, encoded in a label which is on the side of the media (cartridge) which is readable by the library robot. Thus, physical volume 44 will have a VOLSER as will the logical data volumes 51 through 58. The typical data storage media 44 includes an index or a volume table of contents (VTOC) 60 which identifies each of the data volumes 18 stored on the physical volume.

Figures 4A, 4B:
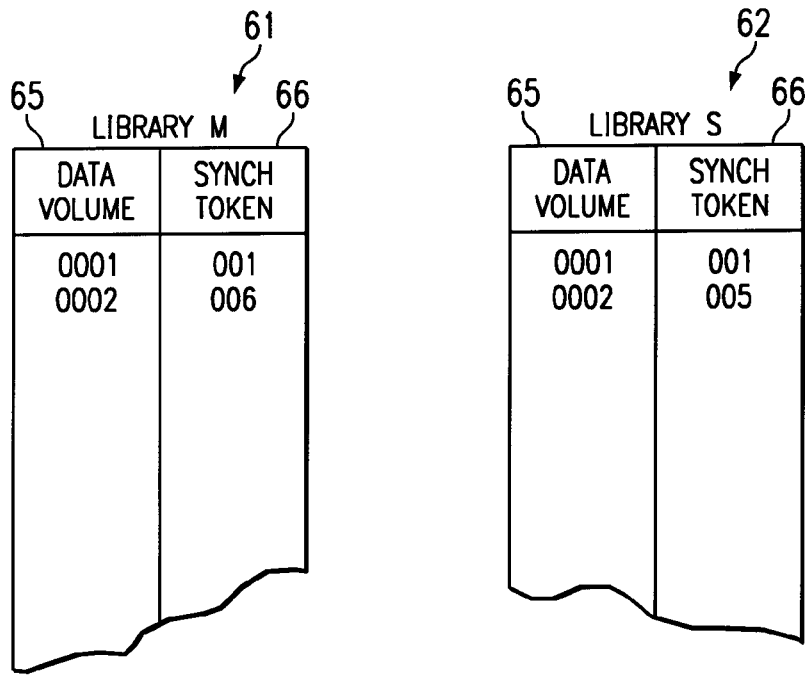
FIGS. 4A and 4B are diagrammatic representations of tables relating data volumes to synchronization tokens that may be employed in the data storage library system of FIG. 1.

In accordance with the present invention, the library controller 30 provides a synchronization token directly associated with each data volume, the synchronization token comprising an updatable token. Referring to FIG. 3, the synchronization tokens may be directly associated with data volumes 18 by storing the tokens with the VTOC 60 for each physical volume 44, or alternatively may be stored directly with each data volume 51–58. Referring to FIGS. 4A and 4B, the synchronization tokens may be stored in tables 61 and 62 of each library 15 and 14, respectively, in the database 36 of the library controller 30. The data volumes are each identified, for example, by its VOLSER in column 65, and the directly associated synchronization token is in column 66 in the same row as the VOLSER.

Referring to FIG. 1, a plurality of directors 71–74 are provided, each separate from and coupled to the hosts 11–12 and each separate from and coupled to each data storage library 14–15. Each director responds to ones of separate, partitioned access addresses such as data storage drive addresses, addressed by the hosts with the supplied command. For example, director 71 responds to drive addresses 0–3, director 72 responds to drive addresses 4–7, director 73 responds to drive addresses 8–B, and director 74 responds to drive addresses C–F.

Each director 71–74 is a data processor with interfaces 69–70 appropriate to the connections to the hosts 11–12 and to the libraries 14–15, such as ESCON or SCSI, but without a display, and comprises, for example, an IBM RS-6000 processor.

Each director is provided with an operating system and application programs for operating in accordance with the present invention. The application programs may comprise a computer program product, comprising computer readable program code. The computer program product may be supplied electronically, as from a network or one of the hosts 11–12 at a communications interface. Alternatively, the computer program product may be supplied at an I/O station of the processor or from a data storage library from a storage media which stores executable computer instructions, and comprises an article of manufacture, such as data storage media 44 in FIG. 3. Another example of a storage media which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions.

The responding director 71–74 responds to the command and to any accompanying data volume 18 supplied by the addressing host 11–12, in turn supplying the command and accompanying data volume 18 to all of the plurality of data storage libraries 14–15, and the responding director 71–74 updates each synchronization token directly associated with the supplied data volume.

The synchronization tokens may comprise incrementable integers, which are updated by the responding director 71–74 by incrementing each synchronization token directly associated with the supplied data volume, e.g., in column 66 in both table 61 and in table 62 of FIGS. 4A and 4B. The responding director may increment each synchronization token directly associated with the same supplied data volume to the same integer value. The director may determine the integer value by comparing the previous integer value of each synchronization token directly associated with the supplied data volume, and setting the synchronization tokens to a value incremented beyond the most current integer value indicated by the comparison.

Thus, in accordance with the present invention, the directors 71–74 act as a data storage library with respect to the host 11–12, and have capability to store multiple copies of the data volume 18 in the data storage libraries 14–15 without involvement by the host. The currency of the data volumes 18 are each tracked by means of the synchronization token, and the synchronization token is directly associated with the data volume 18, and is not tracked by the host 11–12.

Should one library 14–15 become unavailable, the responding director 71–74 may access the data volume 18 at another of the libraries without involvement by the host.

Specifically, each director is separate from and coupled to each data storage library, such that even a complete failure of a library does not adversely affect the directors.

The director 71–74 may update the data volume and the synchronization token at the other library, and, when the failed library becomes available and the data volume again is accessed, the responding director 71–74 will determine that the synchronization tokens do not match, will provide the most current copy to the host, and will update the data volume that was not current, again without involvement by the host.

The concepts of "MASTER/SLAVE" or "PRIMARY/ SECONDARY" are employed in another embodiment of the present invention, with one of the plurality of data storage libraries 15 designated as a "MASTER" library and all the other data storage libraries 14 each designated as a "SLAVE" library. The directors 71–74, when addressed by the host access address, supply a host supplied data volume first to the "MASTER" library 15 and second to the "SLAVE" libraries 14. The director may copy the data volume from the "MASTER" library 15 to the "SLAVE" libraries 14, and not require involvement by the host in making the duplicate copies.

In a further aspect of the present invention, if the data storage libraries 14–15 asynchronously provide a confirmation "COMMIT" event indicating that the supplied data volume 18 has been stored (on a rewritable data storage media or a Virtual Tape Server non-volatile cache), the responding director 71–74 further increments the synchronization tokens directly associated with the supplied data volume 18 upon the selected library and all the non-selected libraries providing the confirmation "COMMIT" event for the directly associated supplied data volume. Herein, a "COMMIT" event comprises any type of confirmation by a library which indicates that a supplied data volume has been stored on a rewritable data storage media.

In still another embodiment of the present invention, the hosts 11–12 may request multiple access to an existing identifiable data volume 18, addressing the requests to access addresses of at least two of the plurality of directors 71–74. Additionally, the data storage libraries 14–15 each responds to an input data transfer request for an identifiable data volume 18 by becoming ready to receive the identifiable data volume, e.g., by mounting the physical volume on a drive 35, and then provides a "READY" signal which indicates the data storage library is ready to receive the input data transfer. In accordance with the present invention, the responding directors 71–74 each supplies the input data transfer request with respect to the data volume 18 to all the coupled data storage libraries 14–15, and the responding directors 71–74 each waits a predetermined time-out period of time for all of the data storage libraries 14–15 to provide the "READY" signal, and if not all the data storage libraries provide the "READY" signal within the time-out period, the responding directors each releases those of the data storage libraries that do respond, and then each of the responding directors retries the request after differing periods of time.

Figure 5:
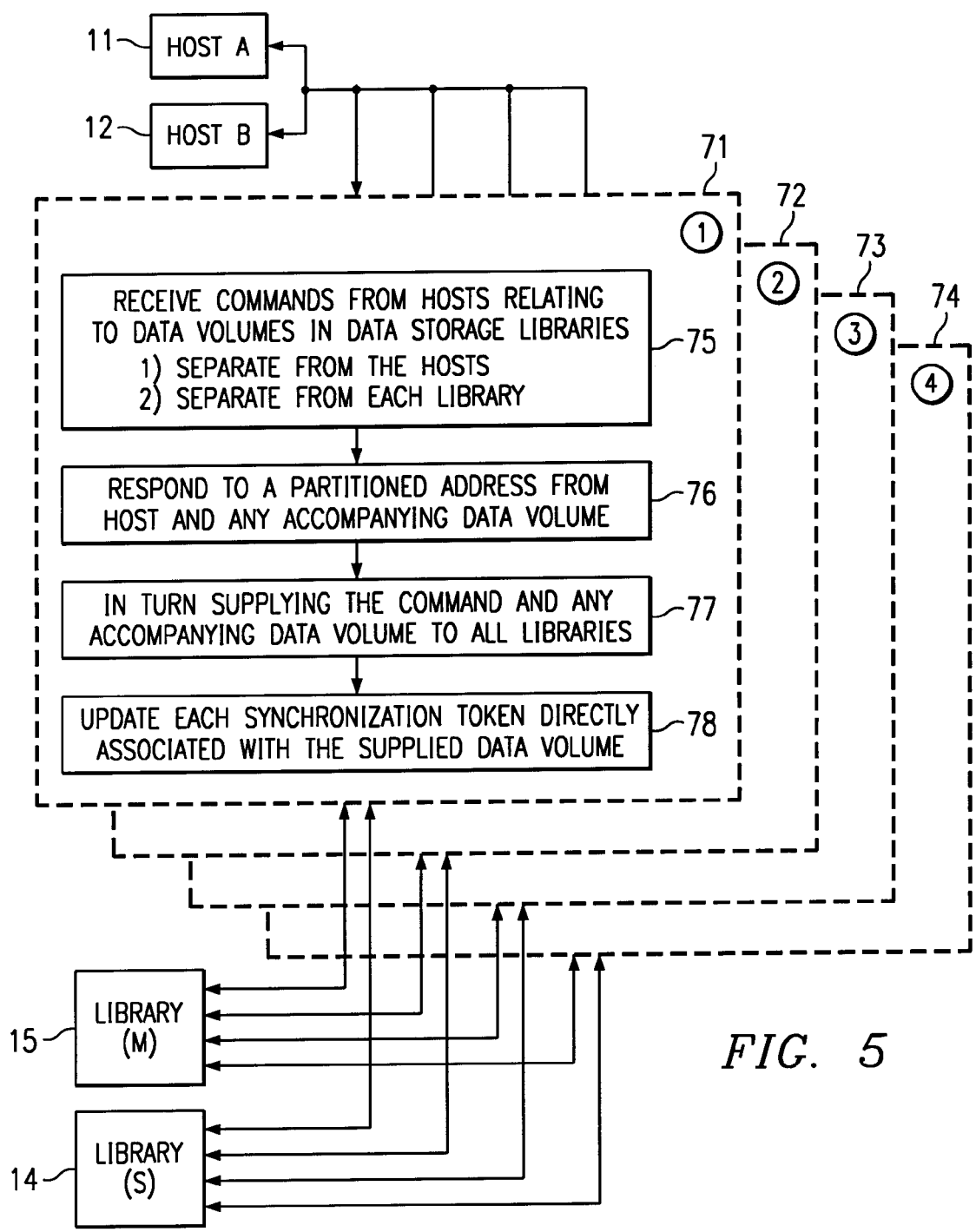
FIG. 5 is a flow chart depicting a generalized embodiment of a method in accordance with the present invention.

FIG. 5 depicts a generalized method in accordance with an embodiment of the present invention for redundantly storing and accessing identifiable data volumes. The method is best implemented as a computer program product for operating the programmable computer processors of the directors 71–74 in FIG. 2. As discussed above, computer program products may be supplied electronically, as from a network or one of the hosts 11–12 at a communications interface 69. The computer program product may alternatively be supplied at an I/O station of the processor or from a data storage library from a storage media which stores executable computer instructions, and comprises an article of manufacture, such as data storage media 44 in FIG. 3.

As discussed above, referring additionally to FIG. 1, the hosts 11–12 address the directors by access addresses, which may comprise data storage drive addresses, supply the data volumes to be stored, and receive the accessed data volumes. The directors, in step 75, receive commands from the hosts 11–12 relating to identifiable data volumes, and are separate from the hosts and separate from each of the data storage libraries 14–15. In step 76, the directors respond to ones of separately partitioned separated access addresses addressed by the hosts and to any accompanying data volumes. In step 77, the director which responds to a partitioned access address and to an accompanying data volume supplied by the addressing host, in turn supplies the data volume to all of the data storage libraries. Lastly, in step 78, a synchronization token is provided for each data volume for each library, to be directly associated with each data volume. The synchronization token is updatable, for example by incrementing. The responding director updates each of the synchronization tokens directly associated with the supplied data volume.

FIG. 6 is a flow chart depicting an embodiment of a method in accordance with the present invention for creating and accessing a new data volume in the data storage library system of FIG. 1. The method is initiated at step 80 by a host 11–12 issuing a command to "CREATE" and "ACCESS" a new data volume 18. The host may have initiated a plurality of data volumes which were identified by the library controller 30, in FIG. 2, in the database 36 for each library. The host addresses the command to one of the access or drive addresses O–F used to partition the directors 71–74.

In step 81, each of the directors 71–74 receives the command, and in step 82 determines whether the access, or drive, address is in the range of addresses for the receiving director. If not, "NO", the receiving director ignores the command and recycles to step 81 to receive the next command from one of the hosts. If the access address is within the range of addresses for the receiving director, "YES", the director is a responding director and will respond to the command.

In step 83, the responding director 71–74, in turn, forwards the command to a selected library 14–15, which in one embodiment, may be a designated "MASTER" library 15. The library to which the command is forwarded, conducts a normal process in step 84 for creating and accessing the new data volume.

The responding director, in step 85, sets the synchronization token for the new data volume to an initial value, and, in step 86, sends the synchronization token to the selected library, such as "MASTER" library 15. The selected library then, in step 87, stores the synchronization token so that it is directly associated with the new data volume. As discussed above, the synchronization token may be stored with the data volume (e.g., data volume 51 in FIG. 3) on the data storage media, with the VTOC for the data volume on the data storage media (e.g., VTOC 60 in FIG. 3), or in a table in the database of the library controller for the data volume (e.g., table 61 in FIG. 4A).

Then, the responding director 71–74 sends the command to the non-selected library or libraries, such as "SLAVE" library 14, in step 90. The non-selected libraries each conducts a normal process in step 91 for creating and accessing the new data volume at the respective library.

The responding director, in step 92, sets the synchronization token for the new data volume at the non-selected libraries to an initial value and, in step 93, sends the synchronization token to the non-selected libraries. The initial value of the synchronization token is preferably identical for each copy of the new data volume. In step 94, the non-selected libraries each stores the synchronization token so as to be directly associated with the new data volume, as discussed above.

The responding director 71–74 then returns a "JOB COMPLETE" (or a "RETURN") signal to the addressing host 11–12, in step 95.

As an alternative, the responding director may send the command to the selected library and send the command to the other libraries at the same time without waiting for the selected library respond to the mount.

Figure 8:
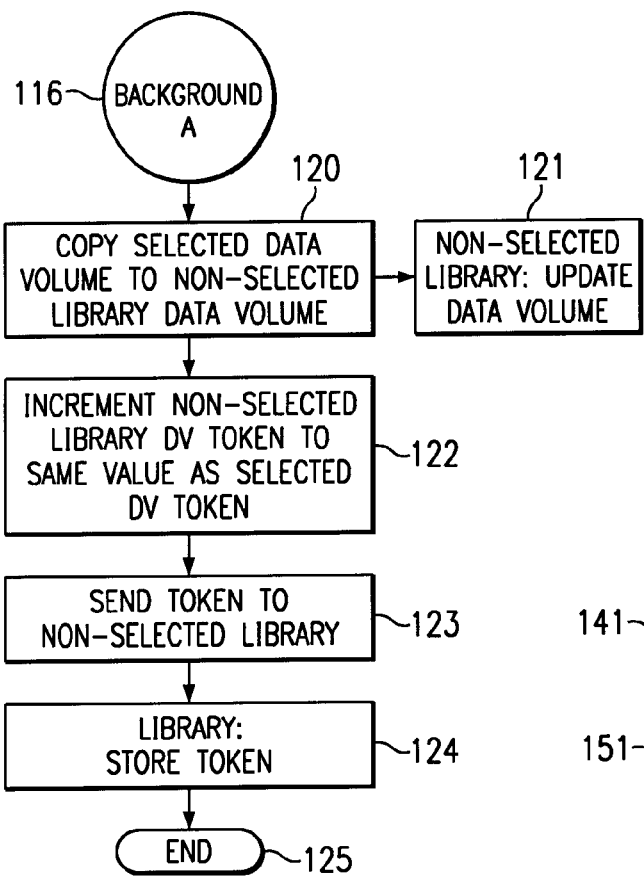

FIGS. 7 and 8 illustrate an embodiment of a method in accordance with the present invention for accessing an identified data volume in the data storage library system of FIG. 1. The method is initiated at step 100 by a host 11–12 issuing a command to "ACCESS" an identified data volume 18. The data volume is identified, for example, by its VOLSER, and the command is addressed to one of the access, or drive, addresses O–F used to partition the directors 71–74.

In step 101, each of the directors 71–74 receives the command, determining in step 102 whether the drive address is in the range of drive addresses for the receiving director. If not, "NO", the receiving director ignores the command and recycles to step 101 to receive the next command from one of the hosts. If the drive address is within the range o f drive addresses for the receiving director, "YES", the director is a responding director and will respond to the command.

In step 103, the responding director 71–74, in turn, forwards the access command to the selected library, which may be a designated "MASTER" library 15, and to the non-selected libraries, such as "SLAVE" library 14. The commands are preferably forwarded at the same time in order to speed the response time of the data storage library system. However, as an alternative, the commands may be forwarded sequentially.

Each of the libraries responds to the forwarded command, in step 105, conducting a normal access of the identified data volume. Specifically, in the illustrated example, the library controller 30 of FIG. 2 determines whether the data volume 18 is in the cache 40, and, if not, determines the physical volume containing the data volume and the storage shelf 20 storing the physical volume, operating the robot 22 to access the physical volume and deliver it to a data storage drive 35.

In step 106, the responding director 71–74 reads the synchronization token for the identified data volume 18 from each library. The responding director compares the synchronization tokens in step 107, and in step 108 determines whether the synchronization tokens are all the same value or if one or more are different from the others.

If the tokens are the same, "YES", the responding director selects one of the data volumes, for example, the data volume of the "MASTER" library, in step 109, records the identification of the selected library in step 110, and returns a "COMMAND COMPLETED" (or a "RETURN") signal to the host in step 112.

If step 108 indicates that one of the synchronization tokens for the identified data volume is different from the others, "NO", the responding director, in step 115, selects the data volume with the highest value synchronization token. The highest value token is, in accordance with the present invention, the most current. Here also, in step 110, the responding director records the identification of the selected library, and returns a "COMMAND COMPLETED" (or a "RETURN") signal to the host in step 112.

Additionally, the responding director calls, in step 116, a background function, illustrated as "BACKGROUND A" in FIG. 8. The background function updates both the data volume and the directly associated token for the data volume that has the synchronization token that is not current, or has a value less than that of the selected data volume. The background function of FIG. 8 operates without involvement of the host, which has received the return for the command in step 112.

Referring additionally to FIG. 8, in step 120, the recorded identification of the selected library of step 110 is utilized, and the responding director 71–74 copies the accessed and selected data volume from the selected library to the non-selected library data volume. In step 121, the non-selected library updates the data volume, and, in step 122, the responding director increments the non-selected library data volume synchronization token to the same value as the selected library data volume synchronization token, and sends the updated synchronization token to the non-selected library in step 123. The non-selected library stores the updated token in step 124 so as to be directly associated with the updated data volume. As the result, the identified data volumes and their associated synchronization tokens for each of the libraries are current. Step 125 represents the end of the background function.

Typically, a host system 11–12 accesses an identified data volume in order to read and/or write. FIGS. 9–13 illustrate alternative embodiments of a method in accordance with the present invention for storing a host supplied data volume in the data storage library system of FIG. 1, which may comprise an identified data volume accessed in the process of FIGS. 7 and 8.

The host system initiates the write operation at step 140 by issuing a command to "WRITE" an identified data volume 18. The data volume is identified, typically, by its VOLSER, and the command is addressed to one of the access or drive addresses O–F used to partition the directors 71–74. As discussed above, the data volume has either been created or accessed in the previous processes discussed above, or, if the "CREATE" or "ACCESS" and "WRITE"

commands are included in a single group, the access of the identified data volume is conducted in accordance with the above processes in step 141.

The host addresses the command to one of the access addresses O–F used to partition the directors 71–74, and, in step 151, each of the directors 71–74 receives the command, determining in step 152 whether the access address is in the range of access addresses for the receiving director. If not, "NO", the receiving director ignores the command and recycles to step 151 to receive the next command from one of the hosts. If the access address is within the range of access addresses for the receiving director, "YES", the director is a responding director and will respond to the command.

In step 153, the responding director 71–74, determines the selected library. If the identified data volume had been accessed and selected in step 109 or in step 115 in FIG. 7, the library recorded in step 110 is the selected library. In step 154 of FIG. 9, the responding director increments the selected library synchronization token directly associated with the identified data volume.

In step 160, the responding director instructs the selected library to save the data volume as received from the host, for example, in the cache 40 of FIG. 2. The data volume received from the host is the most current of the data volume copies at that moment. Then, in step 161, the responding director 71–74, in turn, forwards the "WRITE" command from the host to the selected library 14–15, together with the data volume to be written.

Two alternative approaches are provided in accordance with the present invention to store the data volume and the directly associated synchronization token in each of the libraries. One alternative, "ALTERNATIVE 1", is conducted at connector 165 to FIG. 10, and the other alternative, "ALTERNATIVE 2" is conducted at connector 166 to FIG. 11.

Referring first to FIG. 10, at step 170, the selected library conducts normal storage of the data volume, and stores the synchronization token so as to be directly associated with the data volume, as discussed above. If the selected data storage library is a Virtual Tape Server, it then returns a "COMMIT" event to the responding director in step 171. The process then proceeds to background "B" at connector 172.

The background "B" function is illustrated in FIG. 12. In the background, the responding director 71–74, in step 175, increments the non-selected library synchronization token for the data volume, and, in step 176, copies the "current" data volume saved in step 160 of FIG. 9 to the non-selected library or libraries. It is possible that the data volume may be further updated during this process, as will be explained. The non-selected library, in step 178, conducts normal storage of the data volume and stores the synchronization token so as to be directly associated with the data volume. Again, if the non-selected library is a Virtual Tape Server, the library returns a "COMMIT" event in step 179. The responding director then, in step 180, employs connector 180 to go to a common function of FIG. 13.

In the other alternative, "ALTERNATIVE 2", illustrated in FIG. 11, the responding director 71–74 increments the non-selected library synchronization token in step 182 in the foreground, as opposed to the background. Operating in the foreground increases the likelihood that the data volume stored in the non-selected library will be the same as that stored in the selected library. The host may be working with a particular data volume in different ways, and may update the data volume more than once in the process. If "ALTERNATIVE 1" is chosen, and the non-selected library data volume is updated in the background, there is thus a chance that the selected library data volume will be updated a second time. If, however, "ALTERNATIVE 2" is chosen, the cost is that the responding director is tied up during the processing time for both libraries, reducing the response time of the director to further received commands.

Figure 9:
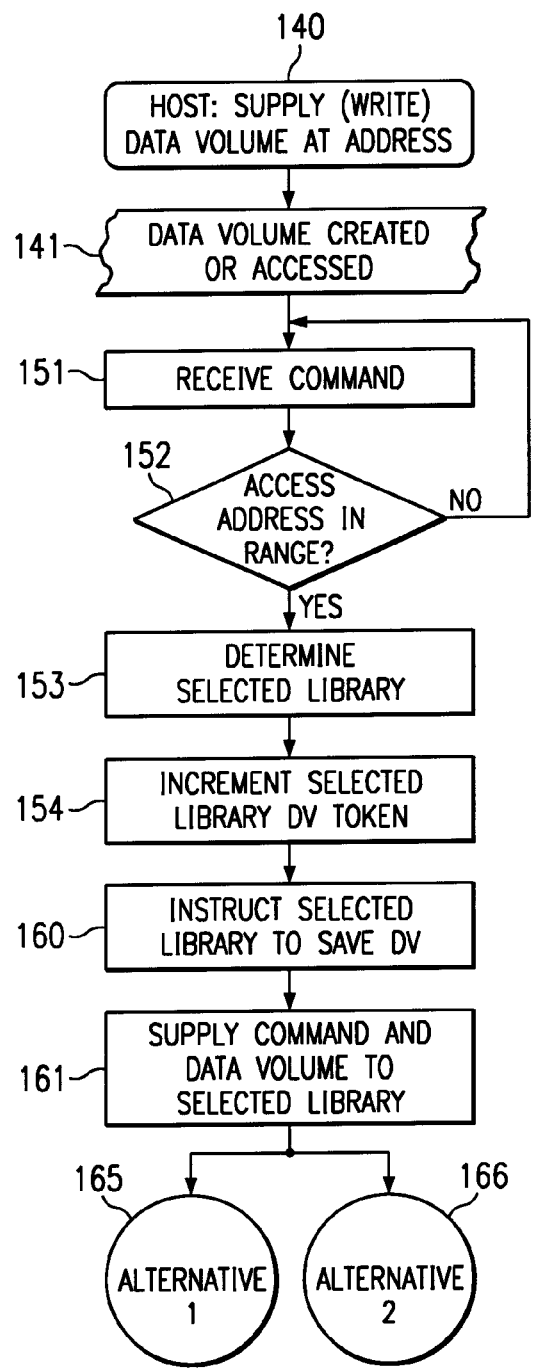

In step 183, the "WRITE" command and the "current" data volume saved in step 160 of FIG. 9 are supplied to the non-selected library or libraries. Both the selected and non-selected libraries conduct, in step 185, normal storage of the data volume and storage of the synchronization token so as to be directly associated with the data volume. Again, if the non-selected library is a Virtual Tape Server, the library returns a "COMMIT" event to the director in step 186. The responding director then employs connector 180 to go to the common background function of FIG. 13.

Figure 13:
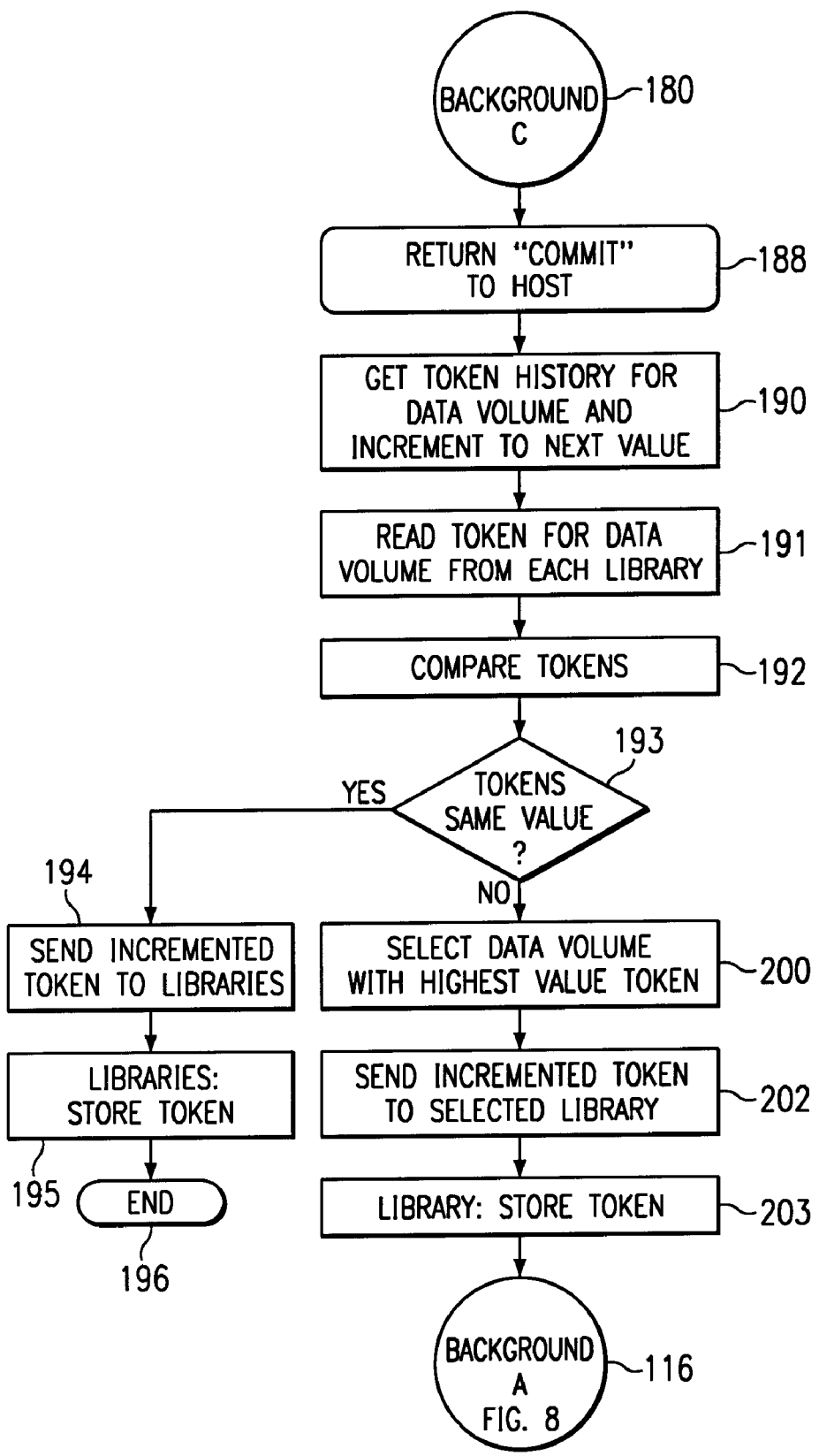

The background "C" function illustrated in FIG. 13 is conducted after both the selected and non-selected libraries have stored updated data volumes and updated directly associated synchronization tokens for the identified data volume. If the libraries are Virtual Tape Servers and have returned "COMMIT" events to the responding director, the responding director, in step 188, returns a "COMMIT" event to the addressing host.

In step 190, the responding director 71–74 gets the synchronization history for the data volume from a history buffer of the director processor, and increments the token to the next higher (or more current) value, and temporarily stores the value. In step 191, the responding director 71–74 reads the synchronization token for the identified data volume 18 from each library. The responding director compares the synchronization tokens in step 192, and in step 193 determines whether the synchronization tokens are all the same value or if one or more are different from the others.

If the tokens are the same, "YES", all of the data volumes are equally current, and the responding director, in step 194, sends the temporarily stored incremented synchronization token to the selected and non-selected libraries. In step 195, the data storage libraries 14–15 store the synchronization token so as to be directly associated with the data volume, completing the background function in step 196.

If step 193 indicates that one of the synchronization tokens for the identified data volume is different from the others, "NO", the responding director, in step 200, selects the data volume with the highest value synchronization token. The highest value token is, in accordance with the present invention, the most current.

The responding director 71–74 then, in step 202, sends the temporarily stored synchronization token to the selected library, and, in step 203, the selected library stores the synchronization token so as to be directly associated with the data volume.

Since only the selected library synchronization token is the current token, connector 116 leads to background function "A" in FIG. 8 to copy the data volume from the selected library to the non-selected library and update the non-selected library token.

Thus, the data storage library system of the present invention provides multiple copies of the current data volume, each copy for one of the libraries 14–15, and tracks the currency of each data volume by means of the synchronization token directly associated with the data volume. The data storage library system provides access to each data volume by each director, even in the event of the complete failure or unavailability of a data storage library, by the directors being separate from and coupled to each data storage library.

Figure 14:
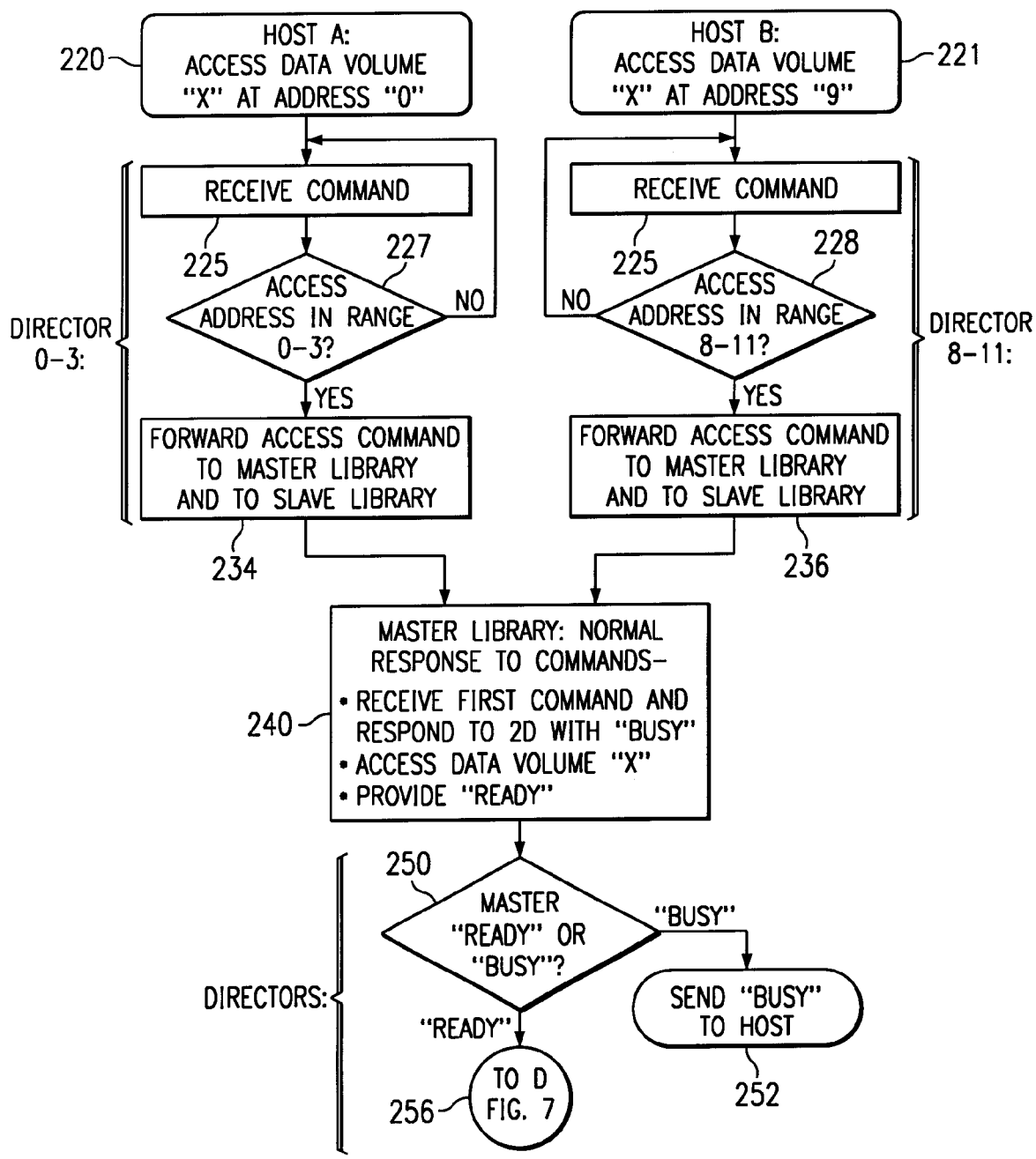
FIGS. 14 and 15 are flow charts depicting alternative embodiments of a method in accordance with the present invention for serializing access to a single data volume in the data storage library system of FIG. 1.
Figure 15:
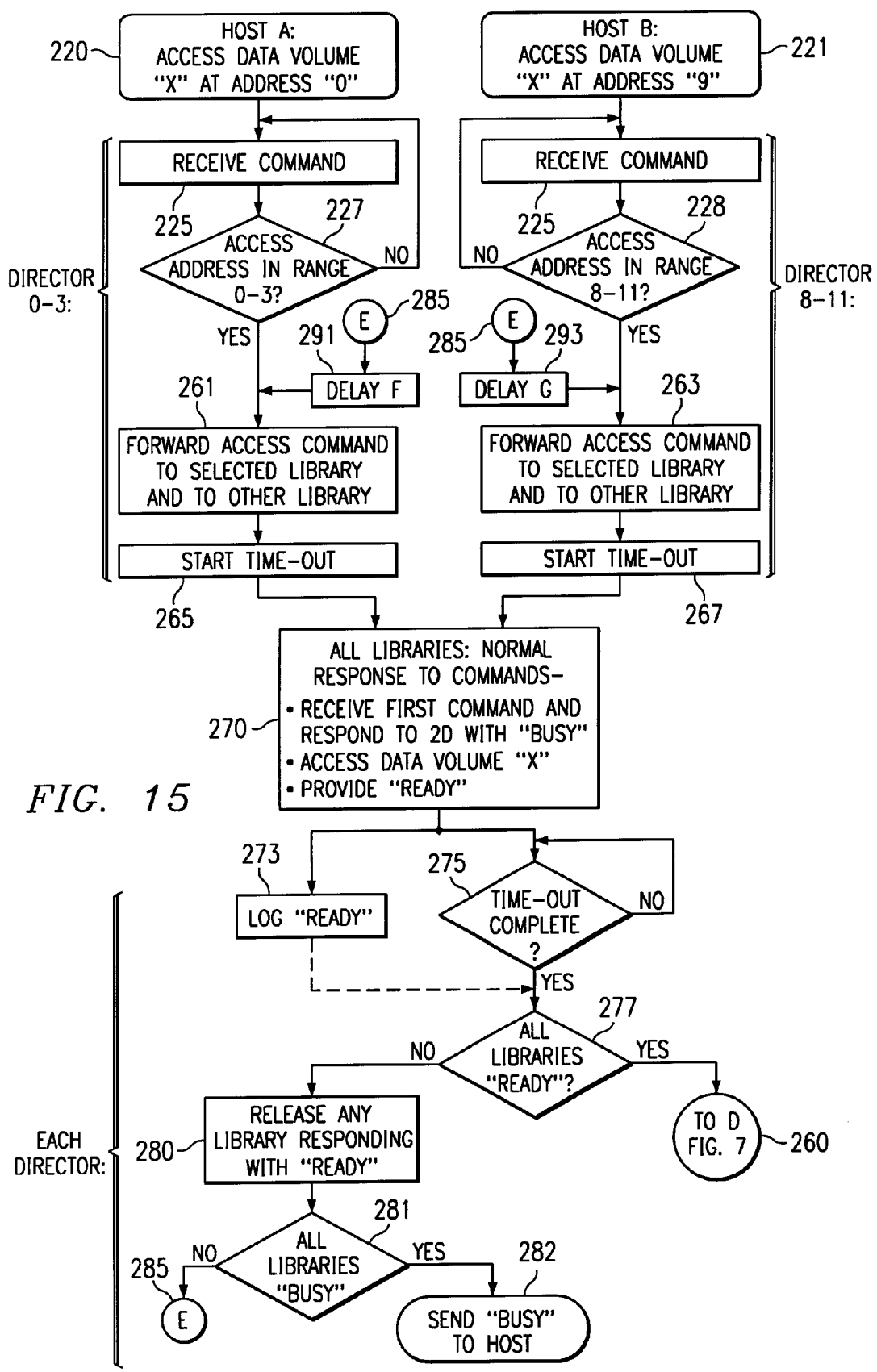

FIGS. 14 and 15 illustrate alternative embodiments of a method in accordance with the present invention for serializing access to a single data volume in the data storage library system of FIG. 1. Either a single host 11–12 or both hosts may request access to the same data volume at substantially the same time, but at different access addresses. To avoid locking the system, the access to the data volume must be serialized, with one host or the host at one drive address becoming successful, while the other receives a "BUSY" signal.

The example chosen to illustrate the alternative embodiments is shown in steps 220 and 221, wherein one host "A", e.g., host system 11, provides a command to access a data volume having VOLSER "X" at a drive address "0", and another host "B", e.g., host system 12, provides a command to access the same data volume "X" at a drive address "9".

The method of FIG. 14 may be employed in the instance when one of the data storage libraries 14–15 is designated as the "MASTER" and the other library or libraries are designated as the "SLAVE".

The method of FIG. 15 allows the director first receiving "READY" responses from all of the libraries to forward the "ACCESS" command.

Referring to FIGS. 1 and 14, all of the directors receive the command in step 225. The director having access addresses 0–3, e.g., director 71, and the director having access addresses 8–11, e.g., director 73, each determines respectively in steps 227 and 228 whether the access address is in the range of access addresses for the receiving director. If not, "NO", the receiving director ignores the command and recycles to step 225 to receive the next command from one of the hosts. If the access address is within the range of access addresses for the receiving director, "YES", the respective director is a responding director and will respond to the command.

In order to serialize the directors, the directors 71–74 race by each forwarding the command to the "MASTER" library 15. The "MASTER" library, in step 240, responds to the forwarded commands in a normal fashion, receiving the first command, and responding to the second command with a "BUSY" signal. The "MASTER" library then accesses the data volume "X", and, when the data storage media is mounted and the data volume accessed, provides a "READY" signal to the director sending the command that was accepted.

Both directors conduct step 250, one receiving a "BUSY" signal, and the other a "READY" signal from the "MASTER" library. The director receiving the "BUSY" then sends a "BUSY" signal to the requesting host 11–12 in step 252.

The director receiving the "READY" signal from the "MASTER" library will complete the access function, which continues at connector "D" 260 to FIG. 7.

In the method of FIG. 15, the director first receiving "READY" responses from all of the libraries will complete the access function.

Referring to FIGS. 1 and 15, all of the directors receive the command in step 225. The director having access addresses 0–3, e.g., director 71, and the director having access addresses 8–11, e.g., director 73, each determines respectively in steps 227 and 228 whether the access address is in the range of access addresses for the receiving director. If not, "NO", the receiving director ignores the command and recycles to step 225 to receive the next command from one of the hosts. If the access address is within the range of access addresses for the receiving director, "YES", the respective director is a responding director and will respond to the command.

Each of the responding directors, in respective steps 261 and 263, forwards the "ACCESS" command to a selected library 14–15 and then to the non-selected library or libraries, as described above. Each of the responding directors, in respective steps 265 and 267, then starts a time-out period.

Each of the libraries, in step 270, responds to the forwarded commands in a normal fashion, receiving the first command, and responding to the second command with a "BUSY" signal. The libraries then access the data volume "X", and, when the data storage media is mounted and the data volume accessed, provide a "READY" signal to the director sending the command that was accepted.

Both directors conduct steps 273 and 275, logging each received "READY" signal, and determining whether the time-out period is complete. If the time-out is not complete, "NO", the process cycles back to the same step 275 and continues to log any received "READY" signal. Once the time-out is complete and has expired, "YES", step 277 determines whether step 273 has logged a "READY" signal from each of the libraries 14–15. If "YES", the responding director will complete the access function to all of the data storage libraries 14–15, and therefore continues at connector "D" 260 to FIG. 7.

If "READY" signals have not been received from all of the data storage libraries 14–15, "NO", the responding director, in step 280, releases any library responding with a "READY" signal, and, in step 281, determines whether all of the libraries have responded with a "BUSY" signal. If "BUSY" signals have been received from all of the data storage libraries, "YES", a "BUSY" signal is sent to the addressing host in step 282.

If neither only "READY" nor only "BUSY" signals have been received from all of the libraries, "NO", connector "E" 285 cycles to steps 291 and 261 for one of the directors, and to steps 293 and 263 for the other of the directors.

In order to serialize the directors, each of the directors 71–74 provides a different delay in respective steps 291 and 293, before again forwarding the command to the libraries 14–15.

Thus, the data storage library system in accordance with the present invention is able to serialize requests for the same data volume and provide redundant access to that data volume without involving the host.

While the preferred embodiments of the present invention have been illustrated in detail, it should be apparent that reordering the steps and modifications and adaptations to those embodiments may occur to one skilled in the art without departing from the scope of the present invention as set forth in the following claims.

We claim:

1. A data storage library subsystem for storing, and maintaining and tracking synchronism between, multiple copies of identifiable data volumes on accessed rewritable data storage media in a plurality of data storage libraries, said data storage library subsystem coupled to at least one host, said hosts for providing commands relating to said identifiable data volumes, addressing said commands using access addresses, supplying said identifiable data volumes to be stored, and receiving said identifiable data volumes, said plurality of data storage libraries each comprising a library controller, said rewritable data storage media, and at least one data storage drive for transferring said data volumes to and from said rewritable data storage media under the control of said library controller, said data storage library subsystem comprising:

a plurality of directors, each comprising a responding director, and each provided separate from and coupled to said at least one host and each separate from and coupled to each said data storage library, each said director receives said commands and access addresses relating to said identifiable data volumes from said hosts;

each said director determines whether said access address of said received command is within a separate partition of said access addresses for said director, wherein each said director responds to ones of separately partitioned said access addresses; and each said director, upon determining that said access address of a received command is within said separate partition for said director, said responding director additionally responds to any accompanying data volume supplied by said addressing host, in turn supplying said command and accompanying data volume to all of said plurality of data storage libraries, and updates a synchronization token to an updated value, said synchronization token directly associated with said supplied data volume for each of said plurality of data storage libraries.

2. The data storage library subsystem of claim 1, wherein one of said plurality of data storage libraries is designated as a "MASTER" library and all other of said plurality of data storage libraries are each designated as a "SLAVE" library, and wherein said plurality of directors, when addressed by said at least one host at said partitioned address, in turn supplies said any accompanying data volume first to said "MASTER" library and second to said "SLAVE" libraries.

3. The data storage library subsystem of claim 2, wherein said addressed director first supplies said host supplied data volume to said "MASTER" library and then copies said host supplied data volume from said "MASTER" library to said "SLAVE" libraries.

4. The data storage library subsystem of claim 3, wherein said synchronization token comprises an incrementable integer, and wherein said responding director updates said synchronization token by incrementing said synchronization token directly associated with said supplied data volume for said "MASTER" library and for each said "SLAVE" library.

5. The data storage library subsystem of claim 4, wherein said responding director additionally increments each said synchronization token directly associated with said supplied data volume to same current integer value.

6. The data storage library subsystem of claim 5, wherein said responding director additionally compares said integer values of each of said synchronization tokens directly associated with said supplied data volume, and sets said synchronization token having a more current said integer value to a value incremented beyond said more current integer value indicated by said comparison, said incremented beyond value comprising a most current said integer value.

7. The data storage library subsystem of claim 2, wherein said at least one host requests multiple accesses to an identified one of said identifiable data volumes, said hosts addressing said requests to partitioned addresses of at least two of said plurality of directors, wherein said data storage libraries each responds to an input data transfer request for an identifiable data volume by becoming ready to receive said identifiable data volume and providing a "READY" signal which indicates said data storage library is ready to receive said input data transfer, and wherein said responding directors each supplies said input data transfer request with respect to said data volume to said "MASTER" library, and the one of said responding directors receiving said "READY" signal from said "MASTER" data storage library communicates with said "MASTER" and said "SLAVE" libraries, and (at least) the other of said at least two responding directors provides a busy signal to said addressing host.

8. The data storage library subsystem of claim 7, wherein said at least two responding directors supply said input data transfer request to said "MASTER" data storage library sequentially.

9. The data storage library subsystem of claim 2, wherein said data storage libraries asynchronously provide a confirmation "COMMIT" event indicating that said supplied data volume has been stored on a rewritable data storage media thereat, and wherein said responding director further increments said synchronization tokens directly associated with said supplied data volume upon said "MASTER" library and all said "SLAVE" libraries providing said confirmation "COMMIT" event for said directly associated supplied data volume.

10. The data storage library subsystem of claim 1, wherein said responding director selects one of said plurality of data storage libraries and first supplies said host supplied data volume to said selected data storage library and updates said directly associated synchronization token, and subsequently copies said host supplied data volume from said selected one of said plurality of data storage libraries to non-selected ones of said plurality of data storage libraries and updates said directly associated synchronization tokens.

11. A data storage library subsystem for storing, and maintaining and tracking synchronism between, multiple copies of identifiable data volumes on accessed rewritable data storage media in a plurality of data storage libraries, said data storage library subsystem coupled to at least one host, said hosts for providing commands relating to said identifiable data volumes, addressing said commands using access addresses, supplying said identifiable data volumes to be stored, and receiving said identifiable data volumes, said plurality of data storage libraries each comprising a library controller, said rewritable data storage media, and at least one data storage drive for transferring said data volumes to and from said rewritable data storage media under the control of said library controller, said data storage library subsystem comprising:

a plurality of directors, each comprising a responding director, and each provided separate from and coupled to said at least one host and each separate from and coupled to each said data storage library, each said director receives said commands and access addresses relating to said identifiable data volumes from said hosts;

each said director determines whether said access address of said received command is within a separate partition of said access addresses for said director, wherein each said director responds to ones of separately partitioned said access addresses; and each said director, upon determining that said access address of a received command is within said separate partition for said director, said responding director additionally responds to any accompanying data volume supplied by said addressing host, in turn supplying said command and accompanying data volume to all of said plurality of data storage libraries, and updates a synchronization token directly associated with said supplied data volume for each of said plurality of data storage libraries, wherein said synchronization token comprises an incrementable integer, and wherein said responding director updates each said synchronization token directly associated with said supplied data volume by incrementing said synchronization token.

12. The data storage library subsystem of claim 11, wherein said responding director additionally increments each said synchronization token directly associated with said supplied data volume to a same current integer value.

13. The data storage library subsystem of claim 12, wherein said responding director additionally compares said integer values of each of said synchronization tokens directly associated with said supplied data volume, and sets said synchronization token having a more current said integer value to a value incremented beyond said more current integer value indicated by said comparison, said integrated beyond value comprising a most current said integer value.

14. The data storage library subsystem of claim 11, wherein each of said plurality of data storage libraries asynchronously provides a confirmation "COMMIT" event indicating that said supplied data volume has been stored on a rewritable data storage media thereat, and wherein said responding director further increments said synchronization tokens directly associated with said supplied data volume upon all said data storage libraries providing said confirmation "COMMIT" event for said directly associated supplied data volume.

15. The data storage library subsystem of claim 2, wherein said host requests access to an existing said identifiable data volume, wherein said responding director compares said synchronization tokens directly associated with said existing identifiable data volume, and said responding director selects said existing identifiable data volume directly associated with a most current of said compared synchronization tokens.

16. The data storage library subsystem of claim 15, wherein said responding director, upon identifying any of said compared synchronization tokens as down level from said most current token, copies said selected existing identifiable data volume to said data storage library having said down level token, and updates said down level synchronization token to said most current token.

17. A data storage library subsystem for storing, and maintaining and tracking synchronism between, multiple copies of identifiable data volumes on accessed rewritable data storage media in a plurality of data storage libraries, said data storage library subsystem coupled to at least one host, said hosts for providing commands relating to said identifiable data volumes, addressing said commands using access addresses, supplying said identifiable data volumes to be stored, and receiving said identifiable data volumes, said plurality of data storage libraries each comprising a library controller, said rewritable data storage media, and at least one data storage drive for transferring said data volumes to and from said rewritable data storage media under the control of said library controller, said data storage library subsystem comprising:

a plurality of directors, each comprising a responding director, and each provided separate from and coupled to said at least one host and each separate tron and coupled to each said data storage library, each said director receives said commands and access addresses relating to said identifiable data volumes from said hosts;

each said director determines whether said access address of said received command is within a separate partition of said access addresses for said director, wherein each said director responds to ones of separately partitioned said access addresses; and each said director, upon determining that said access address of a received command is within said separate partition for said director, said responding director additionally responds to any accompanying date volume supplied by said addressing host, in turn supplying said command and accompanying data volume to all of said plurality of data storage libraries, and updates a synchronization token directly associated with said supplied data volume for each of said plurality of data storage libraries, wherein said at least one host requests multiple accesses to an identified one of said identifiable data volumes, said hosts addressing said requests to data storage drive addresses of at least two of said plurality of directors, wherein said data storage libraries each responds to an input data transfer request for an identifiable data volume by becoming ready to receive said identifiable data volume and providing a "READY" signal which indicates said data storage library is ready to receive said input data transfer, and wherein said responding directors each supplies said input data transfer request with respect to said data volume to all said coupled data storage libraries, and said responding directors each waits a predetermined time-out period of time for all of said data storage libraries to provide said "READY" signal, and if not all said data storage libraries provide said "READY " signal within said time-out period, said responding directors each releases those of said data storage libraries that do respond, each said responding director retrying said request after differing periods of time.

18. A method for storing, and maintaining and tracking synchronism between, multiple copies of identifiable data volumes in a plurality of data storage libraries, for use by at least one host and transparent to said hosts, said hosts for providing commands relating to said identifiable data volumes, addressing said commands using access addresses, supplying said identifiable data volumes to be stored, and receiving said identifiable data volumes, said identifiable data volumes stored on accessed rewritable data storage media accessible in said plurality of data storage libraries, said method comprising the steps of:

receiving, in a plurality of directors, said directors provided separate from said at least one host and separate from each said data storage library and each comprising a responding director, said commands and said access addresses relating to said identifiable data volumes from said hosts;

determining, in each of said plurality of directors, whether said access address of said received command is within a separate partition of said access addresses for said director, wherein each said director responds to ones of separately partitioned said access addresses; and each said director, upon determining that said access address of a received command is within said separate partition for said director, said responding director responding to any accompanying data volume supplied by said addressing host, in turn supplying said command and accompanying data volume to all of said plurality of data storage libraries; and updating a synchronization token to an updated value, said synchronization token to be directly associated with each said data volume, said synchronization token comprising an updatable synchronization token, said updated synchronization token directly associated with said supplied data volume.

19. The method of claim 18, wherein one of said plurality of data storage libraries is designated as a "MASTER" library and all other of said plurality of data storage libraries are each designated as a "SLAVE" library, and wherein said in turn supplying step additionally comprises responding to any accompanying data volume supplied by said at least one host, in turn supplying said accompanying data volume first to said "MASTER" library and second to said "SLAVE" libraries.

20. The data storage library system of claim 19, wherein said in turn supplying step comprises the steps of:
supplying said host supplied data volume first to said "MASTER" library; and
subsequently copying said host supplied data volume from said "MASTER" library to said "SLAVE" libraries.

21. The method of claim 20, wherein said synchronization token comprises an incrementable integer, and wherein said updating step comprises incrementing said synchronization token directly associated with said supplied data volume for said "MASTER" library and for each said "SLAVE" library.

22. The method of claim 21, wherein said updating step additionally comprises incrementing each said synchronization token directly associated with said supplied data volume to a same current integer value.

23. The method of claim 22, wherein said updating step additionally comprises the steps of:
comparing said integer values of each of said synchronization tokens directly associated with said supplied data volume; and
setting said synchronization token having a more current said integer value to a value incremented beyond said more current integer value indicated by said comparison, said incremented beyond value comprising a most current said integer value.

24. The method of claim 19, wherein said at least one host requests multiple accesses to an identified one of said identifiable data volumes, said hosts addressing said requests to at least two of said partitioned addresses, wherein said data storage libraries each responds to an input data transfer request for an identifiable data volume by becoming ready to receive said identifiable data volume and providing a "READY" signal which indicates said data storage library is ready to receive said input data transfer, and wherein said method additionally comprises the steps of:
supplying, in response to each of said partitioned addresses, said input data transfer request with respect to said data volume to said "MASTER" library;
in response to receipt of said "READY" signal from said "MASTER" data storage library at one of said partitioned addresses, communicating at said partitioned address with said "MASTER" and said "SLAVE" libraries; and
at at least the other of said at least two partitioned addresses, providing a busy signal to said addressing host.

25. The method of claim 24, wherein said input data transfer request supplying step comprises supplying said input data transfer request to said "MASTER" data storage library sequentially with respect to each respective said at least two of said partitioned addresses.

26. The method of claim 19, wherein said data storage libraries asynchronously provide a confirmation "COMMIT" event indicating that said supplied data volume has been stored on a rewritable data storage media thereat, and wherein said updating step additionally comprises further incrementing said synchronization tokens directly associated with said supplied data volume upon said "MASTER" library and all said "SLAVE" libraries providing said confirmation "COMMIT" event for said directly associated supplied data volume.

27. The method of claim 18, wherein said in turn supplying step and said updating step additionally comprise the steps of:
selecting one of said plurality of data storage libraries;
first supplying said host supplied data volume to said selected data storage library;
updating said directly associated synchronization token of said selected data storage library;
subsequently copying said host supplied data volume from said selected data storage library to non-selected said data storage libraries; and
updating said directly associated synchronization tokens of said non-selected said data storage libraries.

28. A method for storing, and maintaining and tracking synchronism between, multiple copies of identifiable data volumes in a plurality of data storage libraries, for use by at least one host and transparent to said hosts, said hosts for providing commands relating to said identifiable data volumes, addressing said commands using access addresses, supplying said identifiable data volumes to be stored, and receiving said identifiable data volumes, said identifiable data volumes stored on accessed rewritable data storage media accessible in said plurality of data storage libraries, said method comprising the steps of:
receiving, in a plurality of directors, said directors provided separate from said at least one host and separate from each said data storage library and each comprising a responding director, said commands and said access addresses relating to said identifiable data volumes from said hosts;
determining, in each of said plurality of directors, whether said access address of said received command is within a separate partition of said access addresses for said director, wherein each said director responds to ones of separately partitioned said access addresses; and
each said director, upon determining that said access address of a received command is within said separate partition for said director, said responding director responding to any accompanying data volume supplied by said addressing host, in turn supplying said command and accompanying data volume to all of said plurality of data storage libraries; and
updating a synchronization token to be directly associated with each said data volume, said synchronization token comprising an updatable synchronization token, said updated synchronization token directly associated with said supplied data volume, wherein said said synchronization token comprises an incrementable integer, and wherein said updating said synchronization token step comprises incrementing each said synchronization token directly associated with said supplied data volume.

29. The method of claim 28, wherein said updating step additionally comprises incrementing each said synchronization token directly associated with said supplied data volume to a same current integer value.

30. The method of claim 19, wherein said updating step additionally comprises the steps of:

comparing said integer values of each of said synchronization tokens directly associated with said supplied data volume; and setting said synchronization token having a more current said integer value to a value incremented beyond said more current integer value indicated by said comparing step, said incremented beyond value comprising a most current said integer value.

31. The method of claim 28, wherein each of said plurality of data storage libraries asynchronously provides a confirmation "COMMIT" event indicating that said supplied data volume has been stored on a rewritable data storage media thereat, and wherein said updating step additionally comprises further incrementing said synchronization tokens directly associated with said supplied data volume upon all said data storage libraries providing said confirmation "COMMIT" event for said directly associated supplied data volume.

32. The method of claim 28, wherein said host requests access to an existing said identifiable data volume, said method comprising the additional steps of:

comparing said synchronization tokens directly associated with said existing identifiable data volume; and selecting said existing identifiable data volume directly associated with a most current of said compared synchronization tokens.

33. The method of claim 32, wherein said comparing step additionally comprises identifying any of said compared synchronization tokens as down level from said most current token, and wherein said method comprises the additional steps of:

upon said identifying step identifying any of said down level synchronization tokens, copying said selected existing identifiable data volume to said data storage library having said down level token; and updating said down level synchronization token to said most current token.

34. A method for storing, and maintaining and tracking synchronism between, multiple copies of identifiable data volumes in a plurality of data storage libraries, for use by at least one host and transparent to said hosts, said hosts for providing commands relating to said identifiable data volumes, addressing said commands using access addresses, supplying said identifiable data volumes to be stored, and receiving said identifiable data volumes, said identifiable data volumes stored on accessed rewritable data storage media accessible in said plurality of data storage libraries, said method comprising the steps of:

receiving, in a plurality of directors, said directors provided separate from said at least one host and separate from each said data storage library and each comprising a responding director, said commands and said access addresses relating to said identifiable data volumes from said hosts;

determining, in each of said plurality of directors, whether said access address of said received command is within a separate partition of said access addresses for said director, wherein each said director responds to ones of separately partitioned said access addresses; and each said director, upon determining that said access address of a received command is within said separate partition for said director, said responding director responding to any accompanying data volume supplied by said addressing host, in turn supplying said command and accompanying data volume to all of said plurality of data storage libraries; and updating a synchronization token to be directly associated with each said data volume, said synchronization token comprising an updatable synchronization token, said updated synchronization token directly associated with said supplied data volume, wherein said at least one host requests multiple accesses to an identified one of said identifiable data volumes, said hosts addressing said requests to at least two of said partitioned addresses, wherein said data storage libraries each responds to an input data transfer request for an identifiable data volume by becoming ready to receive said identifiable data volume and providing a "READY" signal which indicates said data storage library is ready to receive said input data transfer, and wherein said method comprises the additional steps of:

supplying, in response to each of said partitioned addresses, said input data transfer request with respect to said data volume to all said coupled data storage libraries;

waiting, at each said partitioned address, a predetermined time-out period of time for all of said data storage libraries to provide said "READY" signal; and if not all said data storage libraries provide said "READY" signal within said time-out period to one said partitioned address, releasing those of said data storage libraries that do respond; and retrying said request from each said partitioned address after differing periods of time.

35. A computer program product usable with a plurality of programmable computer processors having computer readable program code embodied therein for storing, and maintaining and tracking synchronism between, multiple copies of identifiable data volumes in a plurality of data storage libraries, for use by at least one host and transparent to said hosts, said hosts for providing commands relating to said identifiable data volumes, addressing said commands using access addresses, supplying said data volumes to be stored, and receiving said identifiable data volumes, said identifiable data volumes stored on accessed rewritable data storage media accessible in said plurality of data storage libraries, comprising;

computer readable program code which causes said programmable computer processors to receive, as a plurality of directors, said directors provided separate from said at least one host and separate from each said data storage library and each comprising a responding director, said commands and access addresses relating to said identifiable data volumes from said hosts;

computer readable program code which causes each of said plurality of programmable computer processor directors to determine whether said access address of said received command is within a separate partition of said access addresses for said director, wherein each said director responds to ones of separately partitioned said access addresses; and computer readable program code which causes each of said plurality of programmable computer processor directors to, upon determining that said access address of a received command is within said separate partition for said director, cause said responding director to additionally respond to any accompanying data volume supplied by said addressing host, in turn supplying said command and accompanying data volume to all of said plurality of data storage libraries; and computer readable program code which causes said programmable computer processor director to update a synchronization token to an updated value, said synchronization token to be directly associated with each said data volume, said synchronization token comprising an updatable token, said updated synchronization token directly associated with said supplied data volume.

36. The computer program product of claim 35, wherein one of said plurality of data storage libraries is designated as a "MASTER" library and all other of said plurality of data storage libraries are each designated as a "SLAVE" library, and wherein said computer readable program code which causes said programmable computer processor director to in turn supply said command, additionally comprises responding to any accompanying data volume supplied by said at least one host, in turn supplying said accompanying data volume first to said "MASTER" library and second to said "SLAVE" libraries.

37. The computer program product of claim 36, wherein said computer readable program code which causes said programmable computer processor director to in turn supply said data volume comprises:
supplying said host supplied data volume first to said "MASTER" library; and subsequently copying said host supplied data volume from said "MASTER" library to said "SLAVE" libraries.

38. The computer program product of claim 37, wherein said synchronization token comprises an incrementable integer, and wherein said computer readable program code causes said programmable computer processor director to update said synchronizing token by incrementing said synchronization token directly associated with said supplied data volume for said "MASTER" library and for each said "SLAVE" library.

39. The computer program product of claim 38, wherein said computer readable program code which causes said programmable computer processor director to update said synchronization token additionally comprises incrementing each said synchronization token directly associated with said supplied data volume to a same current integer value.

40. The computer program product of claim 39, wherein said computer readable program code which causes said programmable computer processor director to update said synchronization token additionally comprises:
comparing said integer values of each of said synchronization tokens directly associated with said supplied data volume; and
setting said synchronization token having a more current said integer value to a value incremented beyond said more current integer value indicated by said comparison, said incremented beyond value comprising a most current said integer value.

41. The computer program product of claim 36, wherein said at least one host requests multiple accesses to an identified one of said identifiable data volumes, said hosts addressing said requests to data storage drive addresses of at least two of said partitioned addresses, wherein said data storage libraries each responds to an input data transfer request for an identifiable data volume by becoming ready to receive said identifiable data volume and providing a "READY" signal which indicates said data storage library is ready to receive said input data transfer, and wherein said computer program product additionally comprises computer readable program code which causes said programmable computer processor directors:

to supply, in response to each of said partitioned addresses, said input data transfer request with respect to said data volume to s aid "MASTER" library;
in response to receipt of said "READY" signal from said "MASTER" data storage library at one of said partitioned addresses, to communicate at said partitioned address with said "MASTER" and said "SLAVE" libraries; and
at at least the other of said at least two partitioned addresses, to provide a busy signal to said addressing host.

42. The computer program product of claim 41, wherein said computer readable program code which causes said programmable computer processor directors to supply said input data transfer request comprises supplying said input data transfer request to said "MASTER" data storage library sequentially with respect to each respective said at least two partitioned addresses.

43. The computer program product of claim 36, wherein said data storage libraries asynchronously provide a confirmation "COMMIT" event indicating that said supplied data volume has been stored on a rewritable data storage media thereat, and wherein said computer readable program code which causes said programmable computer processor directors to update said synchronization token additionally comprises further incrementing said synchronization tokens directly associated with said supplied data volume upon said "MASTER" library and all said "SLAVE" libraries providing said confirmation "COMMIT" event for said directly associated supplied data volume.

44. The computer program product of claim 35, wherein said computer readable program code which causes said programmable computer processor directors to in turn supply said command, and to update said synchronization tokens additionally comprise:
selecting one of said plurality of data storage libraries;
first supplying said host supplied data volume to said selected data storage library;
updating said directly associated synchronization token of said selected data storage library;
subsequently copying said host supplied data volume from said selected data storage library to non-selected said data storage libraries; and
updating said directly associated synchronization tokens of said non-selected said data storage libraries.

45. A computer program product usable with a plurality of programmable computer processors having computer readable program code embodied therein for storing, and maintaining and tracking synchronism between, multiple copies of identifiable data volumes in a plurality of data storage libraries, for use by at least one host and transparent to said hosts, said hosts for providing commands relating to said identifiable data volumes, addressing said commands using access addresses, supplying said data volumes to be stored, and receiving said identifiable data volumes, said identifiable data volumes stored on accessed rewritable data storage media accessible in said plurality of data storage libraries, comprising:
computer readable program code which causes said programmable computer processors to receive, as a plurality of directors, said directors provided separate from said at least one host and separate from each said data storage library and each comprising a responding director, said commands and access addresses relating to said identifiable data volumes from said hosts;

computer readable program code which causes each of said plurality of programmable computer processor directors to determine whether said access address of said received command is within a separate partition of said access addresses for said director, wherein each said director responds to ones of separately partitioned said access addresses; and computer readable program code which causes each of said plurality of programmable computer processor directors to, upon determining that said access address of a received command is within said separate partition for said director, cause said responding director to additionally respond to any accompanying data volume supplied by said addressing host, in turn supplying said command and accompanying data volume to all of said plurality of data storage libraries; and computer readable program code which causes said programmable computer processor director to update a synchronization token to an updated value, said synchronization token to be directly associated with each said data volume, said synchronization token comprising an updatable token, said updated synchronization token directly associated with said supplied data volume, wherein said synchronization token comprises an incrementable integer, and wherein said computer readable program code causes said programmable computer processor director to update said synchronization token by incrementing each said synchronization token directly associated with said supplied data volume.

46. The computer program product of claim 45, wherein said computer readable program code which causes said programmable computer processor director to update said synchronization token additionally comprises incrementing each said synchronization token directly associated with said supplied data volume to a same current integer value.

47. The computer program product of claim 46, wherein said computer readable program code which causes said programmable computer processor director to update said synchronization token additionally comprises:

comparing said integer values of each of said synchronization tokens directly associated with said supplied data volume; and setting said synchronization token having a more current said integer value to a value incremented beyond the most current integer value indicated by said comparison, said incremented beyond value comprising a most current said integer value.

48. The computer program product of claim 45, wherein each of said plurality of data storage libraries asynchronously provides a confirmation "COMMIT" event indicating that said supplied data volume has been stored on a rewritable data storage media thereat, and wherein said computer readable program code which causes said programmable computer processor director to update said synchronization tokens comprises further incrementing said synchronization tokens directly associated with said supplied data volume upon all said data storage libraries providing said confirmation "COMMIT" event for said directly associated supplied data volume.

49. The computer program product of claim 45, wherein said host requests access to an existing said identifiable data volume, said computer program product additionally comprising computer readable program code which causes said programmable computer processor director:

to compare said synchronization tokens directly associated with said existing identifiable data volume; and to select said existing identifiable data volume directly associated with a most current of said compared synchronization tokens.

50. The computer program product of claim 49, wherein said computer readable program code which causes said programmable computer processor to compare said synchronization tokens, additionally comprises identifying any of said compared synchronization tokens as down level from said most current token, and wherein said computer program product additionally comprising computer readable program code which causes said programmable computer processor director:

to, upon identifying any of said down level synchronization tokens, copy said selected existing identifiable data volume to said data storage library having said down level token; and to update said down level synchronization token to said most current token.

51. A computer program product usable with a plurality of programmable computer processors having computer readable program code embodied therein for storing, and maintaining and tracking synchronism between, multiple copies of identifiable data volumes in a plurality of data storage libraries, for use by at least one host and transparent to said hosts, said hosts for providing commands relating to said identifiable data volumes, addressing said commands using access addresses, supplying said data volumes, to be stored, and receiving said identifiable data volumes, said identifiable data volumes stored on accessed rewritable data storage media accessible in said plurality of data storage libraries, comprising:

computer readable program code which causes said programmable computer processors to receive, as a plurality of directors, said directors provided separate from said at least one host and separate from each said data storage library and each comprising a responding director, said commands and access addresses relating to said identifiable data volumes from said hosts;

computer readable program code which causes each of said plurality of programmable computer processor directors to determine whether said access address of said received command is within a separate partition of said access addresses for said director, wherein each said director responds to ones of separately partitioned said access addresses; and computer readable program code which causes each of said plurality of programmable computer processor directors to, upon determining that said access address of a received command is within said separate partition for said director, cause said responding director to additionally respond to any accompanying data volume supplied by said addressing host, in turn supplying said command and accompanying data volume to all of said plurality of data storage libraries; and computer readable program code which causes said programmable computer processor director to update a synchronization token to an updated value, said synchronization token to be directly associated with each said data volume, said synchronization token comprising an updatable token, said updated synchronization token directly associated with said supplied data volume;

wherein said at least one host requests multiple accesses to an identified one of said identifiable data volumes, said hosts addressing said requests to data storage drive addresses of at least two of said partitioned addresses, wherein said data storage libraries each responds to an input data transfer request for an identifiable data volume by becoming ready to receive said identifiable data volume and providing a "READY" signal which indicates said data storage library is ready to receive said input data transfer, and wherein said computer program product additionally comprises computer readable program code which causes said programmable computer processor directors:

to supply, in response to each of said partitioned addresses, said input data transfer request with respect to said data volume to all said coupled data storage libraries;

to wait, at each said partitioned address, a predetermined time-out period of time for all of said data storage libraries to provide said "READY" signal; and if not all said data storage libraries provide said "READY" signal within said time-out period to one said partitioned address, to release those of said data storage libraries that do respond; and to retry said request from each said partitioned address after differing periods of time.

* * * * *